United States Patent
Ravi et al.

(10) Patent No.: US 11,238,519 B1
(45) Date of Patent: Feb. 1, 2022

(54) SEARCH RESULTS BASED ON USER-SUBMITTED CONTENT

(71) Applicant: Amazon Technologies, Inc., Seattle, WA (US)

(72) Inventors: Prashaanth Ravi, Seattle, WA (US); Ekta Aggarwal, Redmond, WA (US); Maher Alhalabi, Issaquah, WA (US); Aneesh Devi, Seattle, WA (US); Avinav Jami, Issaquah, WA (US); Joel Pan, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 194 days.

(21) Appl. No.: 16/052,198

(22) Filed: Aug. 1, 2018

(51) Int. Cl.
*G06Q 30/00* (2012.01)
*G06Q 30/06* (2012.01)
*G06F 16/9535* (2019.01)

(52) U.S. Cl.
CPC ..... *G06Q 30/0631* (2013.01); *G06F 16/9535* (2019.01); *G06Q 30/0603* (2013.01); *G06Q 30/0641* (2013.01)

(58) Field of Classification Search
CPC .......... G06Q 30/0631; G06Q 30/0603; G06Q 30/0641; G06F 16/9535
See application file for complete search history.

(56) References Cited

U.S. PATENT DOCUMENTS

| | | | |
|---|---|---|---|
| 7,295,995 B1 * | 11/2007 | York | G06Q 30/02 705/26.8 |
| 7,689,624 B2 * | 3/2010 | Huang | G06F 16/9535 707/760 |
| 8,402,036 B2 * | 3/2013 | Blair-Goldensohn | G06F 16/345 707/750 |
| 8,463,595 B1 * | 6/2013 | Rehling | G06Q 30/02 704/9 |
| 8,577,753 B1 * | 11/2013 | Vincent | G06Q 30/02 705/26.7 |
| 8,595,151 B2 * | 11/2013 | Hao | G06Q 10/00 705/347 |

(Continued)

FOREIGN PATENT DOCUMENTS

| | | | | |
|---|---|---|---|---|
| WO | WO-2009140296 A1 * | 11/2009 | ......... | G06Q 30/0631 |
| WO | WO-2012037109 A2 * | 3/2012 | ......... | G06Q 30/0629 |

OTHER PUBLICATIONS

"Helpfulness of product reviews as a function of discrete positive and negative emotions," by M.S.I. Malik and Ayyaz Hussain, Computers in Human Behavior 73 (2017), pp. 290-302 (Year: 2017).*

(Continued)

*Primary Examiner* — Anne M Georgalas
(74) *Attorney, Agent, or Firm* — Thomas Horstemeyer, LLP

(57) ABSTRACT

Disclosed are various embodiments for generating search results to search queries based on user-submitted content. A query containing a first search term for an item and a second search term for an intended use of the item is obtained. Then, an item catalog is search for a browse node that includes the item and is related to the intended use of the item. A plurality of items classified within the browse node are selected. A network page that includes the plurality of items classified within the browse node is then generated.

19 Claims, 6 Drawing Sheets

(56) References Cited

U.S. PATENT DOCUMENTS

| | | | | |
|---|---|---|---|---|
| 8,731,995 B2* | 5/2014 | Sun | ................... | G06Q 10/10 |
| | | | | 705/7.32 |
| 8,862,577 B2* | 10/2014 | Hao | ................... | G06Q 30/0201 |
| | | | | 707/723 |
| 9,355,181 B2* | 5/2016 | Bannur | ................... | G06F 16/9535 |
| 10,437,912 B2* | 10/2019 | Berube | ................... | G06F 40/30 |
| 10,636,041 B1* | 4/2020 | Franson | ................... | G06Q 30/02 |
| 10,909,585 B2* | 2/2021 | L'Huillier | ................... | G06Q 30/0281 |
| 10,929,605 B1* | 2/2021 | Rosner | ................... | G06F 16/35 |
| 2009/0063971 A1* | 3/2009 | White | ................... | G11B 27/34 |
| | | | | 715/716 |
| 2009/0193328 A1* | 7/2009 | Reis | ................... | G06N 5/025 |
| | | | | 715/231 |
| 2010/0023311 A1* | 1/2010 | Subrahmanian | ................... | G06F 40/30 |
| | | | | 704/2 |
| 2010/0145940 A1* | 6/2010 | Chen | ................... | G06F 16/35 |
| | | | | 707/736 |
| 2011/0040787 A1* | 2/2011 | Cierniak | ................... | G06F 16/22 |
| | | | | 707/770 |
| 2012/0036482 A1* | 2/2012 | Haynes, II | ................... | G06F 40/169 |
| | | | | 715/838 |
| 2013/0091117 A1* | 4/2013 | Minh | ................... | G06F 16/951 |
| | | | | 707/709 |
| 2014/0236939 A1* | 8/2014 | Wirtz | ................... | G06F 16/9535 |
| | | | | 707/728 |
| 2015/0088894 A1* | 3/2015 | Czarlinska | ................... | G06F 16/243 |
| | | | | 707/738 |
| 2015/0178279 A1* | 6/2015 | Chen | ................... | G06F 16/9535 |
| | | | | 707/748 |
| 2016/0062967 A1* | 3/2016 | Cantarero | ................... | G06F 16/35 |
| | | | | 715/230 |
| 2016/0132900 A1* | 5/2016 | Duggal | ................... | G06Q 30/0201 |
| | | | | 705/7.29 |
| 2016/0171588 A1* | 6/2016 | Linden | ................... | G06F 3/04842 |
| | | | | 705/26.7 |
| 2018/0349981 A1* | 12/2018 | Grandhi | ................... | G06Q 30/0625 |

OTHER PUBLICATIONS

"Web Harvesting and Sentiment Analysis of Consumer Feedback," by Emil S. Chifu, Tiberiu St. Letia, Bogdan Budisan, and Viorica R. Chifu, ACTA Technica Napocensis, vol. 56, No. 3, 2015 (Year: 2015).*

* cited by examiner

SEARCH RESULTS BASED ON USER-SUBMITTED CONTENT

BACKGROUND

Electronic commerce applications allow for users to search for items to purchase. These electronic commerce applications may also allow for users to submit reviews, ratings, scores, and provide other types of feedback on items or products purchased through the electronic commerce application. The user feedback may include valuable information for other users, such as specifying particular limitations of a product or particular uses for which the product excels.

BRIEF DESCRIPTION OF THE DRAWINGS

Many aspects of the present disclosure may be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various implementations for the automated generation of network content (e.g. web pages) that identifies items in an item catalog that are well-reviewed for a particular purpose. Search queries are analyzed to identify an item or item category and a particular use or purpose of the item (e.g. "bug spray for camping," "shoes for running," or "lotion for shaving"). User content (e.g., user reviews, user answers to user questions, etc.) for items in a matching category is analyzed to determine whether the user content is relevant to the search term indicating the particular use or purpose of the item. For example, user reviews of insect repellant might be analyzed for mentions of camping, user reviews of athletic shoes might be analyzed for mentions of running, and user reviews of lotions might be analyze for mentions of shaving. The user content may then be evaluated for positive or negative sentiment, indicating whether users have determined that the items are useful or not useful for the stated purpose in the search query. A results page may then be generated containing a predefined number of the items that users have identified as being the best fit for the identified purpose.

The implementations improve a user's search experience by allowing a user to search for products or items based on the intended use of the item rather than the characteristics of the item itself. For example, users may previously have had to search for sunscreen based on characteristics of the sunscreen itself, such as the sun-protection factor (SPF) rating of the sunscreen, the type of sunscreen (e.g., physical versus chemical), or other characteristics. However, various implementations of the present disclosure would allow for a user that is unfamiliar with sunscreen to search for sunscreen based on the user's intended use (e.g., "best sunscreen for the beach," "best sunscreen for pets," or "best sunscreen for sensitive skin"). In the following discussion, a general description of the system and its components is provided, followed by a discussion of the operation of the same.

Figure 1:
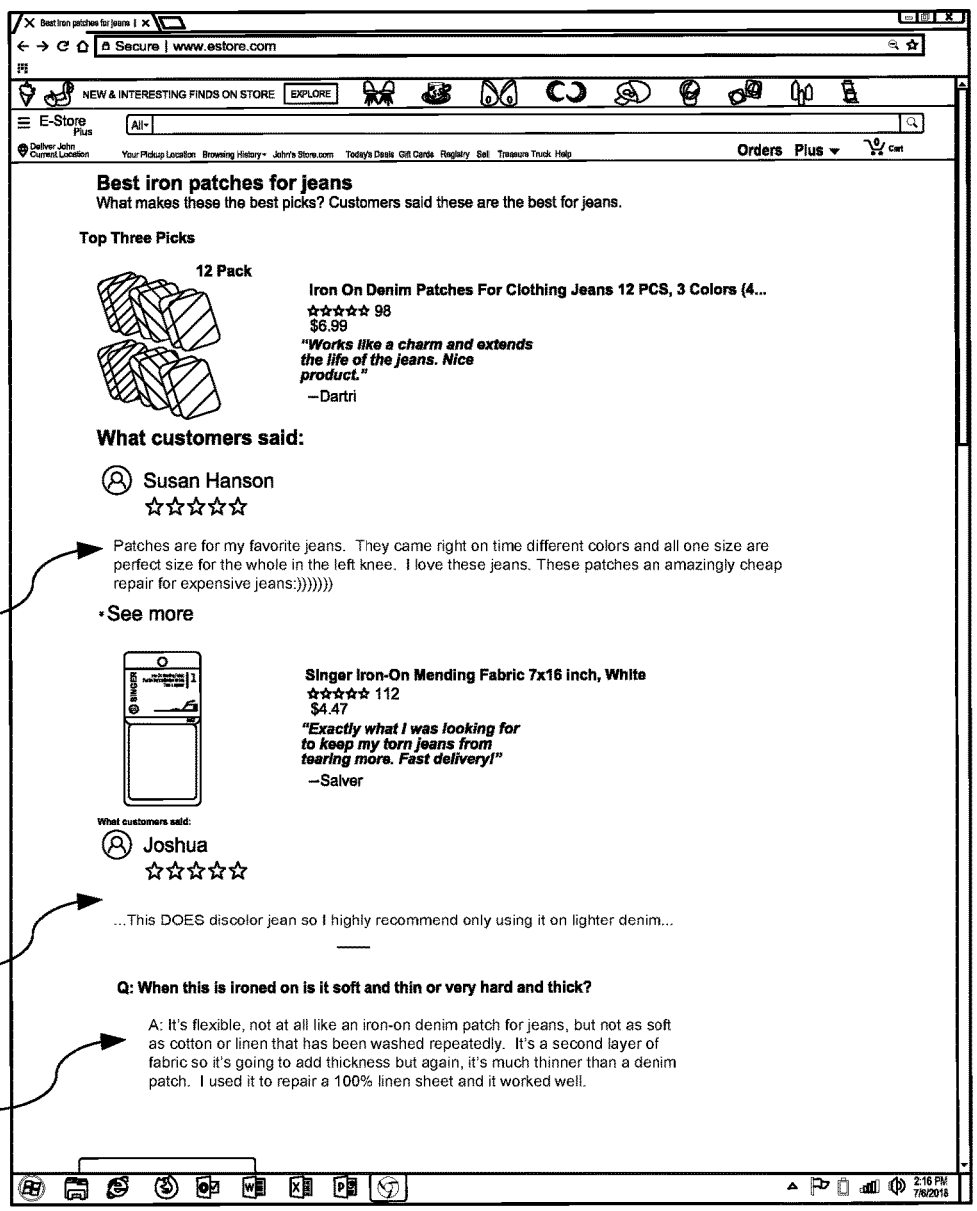
FIG. 1 is a drawing depicting one of several embodiments of the present disclosure.

FIG. 1 depicts an example user interface 100 generated according to various embodiments of the present disclosure. The user interface 100 may be rendered as a web page within a web browser. However, similar information may be displayed and functionality may be rendered through other implementations, such as an application screen provided by a mobile application executing on a mobile computing device or a standalone application executing on a computing device.

As shown, one or more recommendations 103 are rendered within the user interface 100. The recommendations 103 provide links to products that have been automatically identified as being the best fit for a particular purpose (e.g., best iron patches for jeans) based on user reviews, user answers to user question, and similar user-provided content. Each recommendation 103 may include one or more user submissions describing the product to assist a user in selecting a recommend product. The user submissions may be placed more prominently than the product images, descriptions, and links to product pages in order to emphasize the user feedback.

Figure 2:
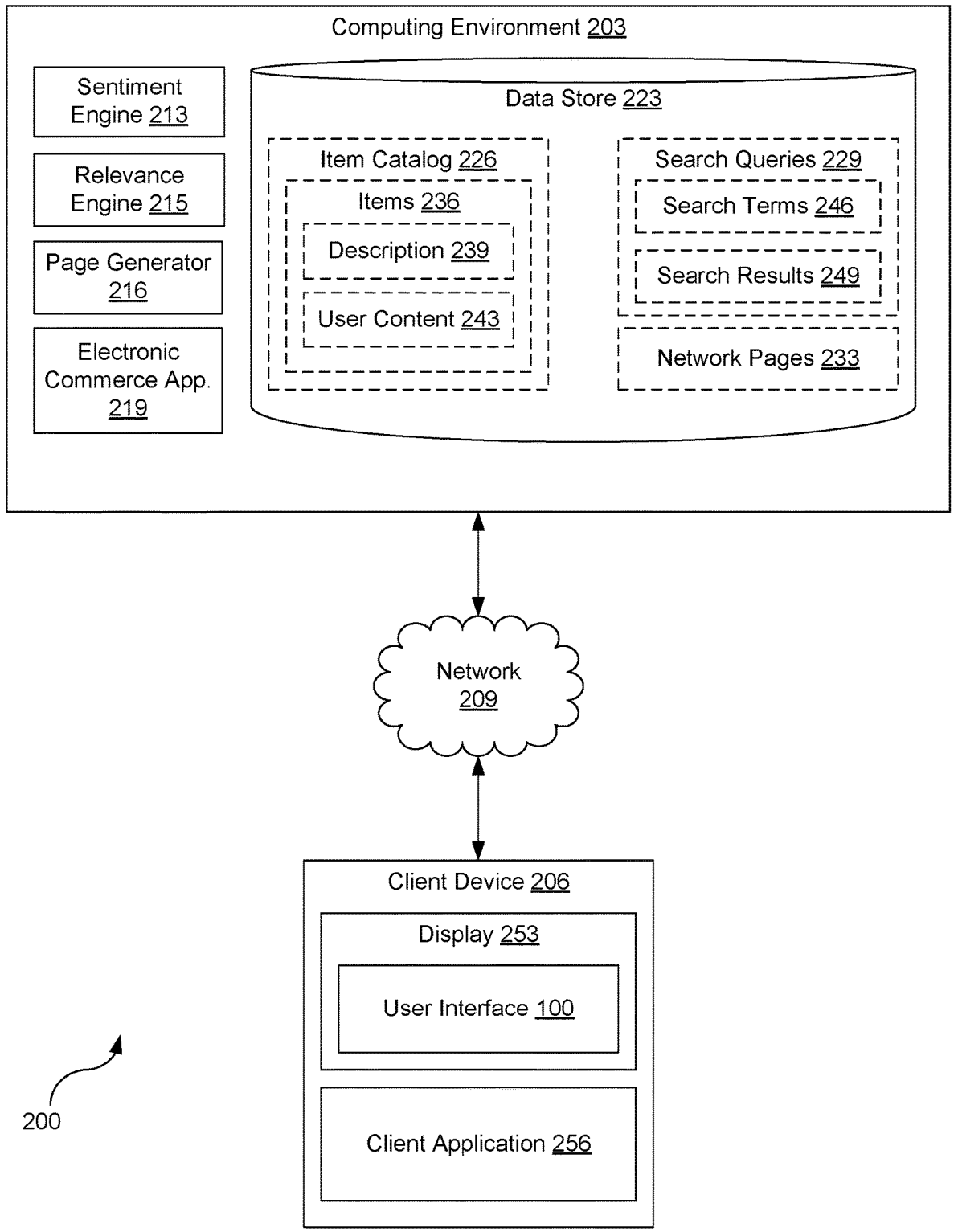
FIG. 2 is a drawing of a networked environment according to various embodiments of the present disclosure.

With reference to FIG. 2, shown is a networked environment 200 according to various embodiments. The networked environment 200 includes a computing environment 203 and a client device 206, which are in data communication with each other via a network 209. The network 209 includes wide area networks (WANs) and local area networks (LANs). These networks may include wired or wireless components or a combination thereof. Wired networks may include Ethernet networks, cable networks, fiber optic networks, and telephone networks such as dial-up, digital subscriber line (DSL), and integrated services digital network (ISDN) networks. Wireless networks may include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 209 may also include a combination of two or more networks 209. Examples of networks 209 may include the Internet, intranets, extranets, virtual private networks (VPNs), and similar networks.

The computing environment 203 may include, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations.

For example, the computing environment 203 may include a plurality of computing devices that together may include a hosted computing resource, a grid computing resource or any other distributed computing arrangement. In some cases, the computing environment 203 may correspond to an elastic computing resource where the allotted capacity of processing, network, storage, or other computing-related resources may vary over time.

Various applications or other functionality may be executed in the computing environment 203 according to various embodiments. The components executed on the computing environment 203, for example, include a sentiment engine 213, a relevance engine 215, a page generator 216, an electronic commerce application 219, and other applications, services, processes, systems, engines, or functionality not discussed in detail herein.

Also, various data is stored in a data store 223 that is accessible to the computing environment 203. The data store 223 may be representative of a plurality of data stores 223, which may include relational databases, object-oriented databases, hierarchical databases, hash tables or similar key-value data stores, as well as other data storage applications or data structures. The data stored in the data store 223 is associated with the operation of the various applications or functional entities described below. This data may include an item catalog 226, one or more search queries 229, one or more network pages 233, and potentially other data.

The item catalog 226 represents a categorized database or similar representation of a collection of items 236. For each item 236 stored in the item catalog 226, a description 239 of the item 236 and one or more instances of user content 243 may be stored in association with the item 236. The item description 239 may include one or more images of the item 236, a video displaying or explaining the item 236, a textual description of the item 236, as well as other content. The user content 243 may include user-submitted reviews of the item 236, user-submitted questions about the item 236 as well as user-submitted answers to the user-submitted questions. User reviews may include a rating (e.g., a score based on a scale).

An item 236 may represent any product, good or service available for sale or lease through the electronic commerce application 219. Goods may be physical goods (e.g., shovels, tents, personal hygiene products, electronics, etc.) or digital goods downloaded from the electronic commerce application 219 (e.g., movies, music, games, software applications, or other digital files). Services may include personal or professional services offered by third-party vendors or by the operator or proprietor of the electronic commerce application 219 itself.

The search queries 229 represent search queries 229 that have been previously submitted by one or more client devices 206. The search queries 229 may be archived or otherwise stored in the data store 223 for analytical purposes. Each search query 229 may contain one or more search terms 246 that were included in the search query 229 when the search query 229 was submitted. The search terms 246 may be related to a search or one or more items 236 in the item catalog 226. For example, a search query 229 could include the text of "best bug spray for camping," which includes the individual search terms 246 "spray" and "camping" as well as the modifiers "best" and "bug." Likewise, a search query 229 could also include the search results 249 that were returned in response to the search query 229, such as a list of items 236 that were returned in response to a search query 229 submitted to the electronic commerce application 219.

The network pages 233 represent network content created and cached by the page generator 216 or the electronic commerce application 219, as further described herein. Examples of network pages 233 include web pages that include content formatted using hypertext markup language (HTML), extensible markup language (XML), or similar languages. Network pages 233 may also include executable scripts to provide dynamic loading of content or to provide an interactive user interface.

The sentiment engine 213 is executed to perform a natural language analysis of arbitrary text submitted by another application and provide an indication of the sentiment expressed by the arbitrary text. For example, if provided with a product review or an excerpt of a product review for an item 236, the sentiment engine 213 could perform a natural language analysis to determine whether the product review was a positive product review (e.g., the user liked the product) or a negative product review (e.g., the user disliked the product). The determination of sentiment could be based on a variety of factors, such as the particular words or phrases that appear in the arbitrary text and the frequency with which they appear. In some implementations, a confidence interval or score may also be provided. For example, the sentiment engine 213 could indicate that the arbitrary text contains a positive sentiment with a 60% level of confidence in the determination (e.g., there is a 60% chance that a product review analyzed by the sentiment engine 213 indicates a positive review of the product).

The functionality provided by the sentiment engine 213 may be used by other applications in a number of ways. For instance, the sentiment engine 213 may provide an application programming interface (API) that may be invoked by another application to make use of the natural language capabilities of the sentiment engine 213. This API may be made available through the network 209 as service that receives requests for analysis of arbitrary text and provides a response that includes the results of the analysis.

The relevance engine 215 is executed to identify instances of user content 243 associated with an item 236 that are relevant to a particular search query 229. The relevance engine 215 may be provided with a list of items 236 and one or more indications of relevance (e.g., a search term 246). In response, the relevance engine 215 can provide an identifier for each instance of user content 243 for each item 236 that is found to be relevant.

The page generator 216 is executed to generate network pages 233 based on user content 243. The page generator 216 may analyze the search queries 229 to determine the type of network pages 233 to be generated as well as to identify the relevant user content 243 and items 236 to include in the network page 233. These network pages 233 may be provided by the electronic commerce application 219 in response to requests from client devices 206. The specific functions of the page generator 216 are described in further detail later in this application.

The electronic commerce application 219 is executed in order to facilitate the online purchase of items 236 over the network 209. The electronic commerce application 219 also performs various backend functions associated with the online presence of a merchant in order to facilitate the online purchase of items 236 as will be described. For example, the electronic commerce application 219 may generate network pages 233 such as web pages or other types of network content that are provided to clients 206 for the purposes of selecting items for purchase, rental, download, lease, or other form of consumption as will be described. Likewise, the electronic commerce application 219 may also provide network pages 233 to client devices 206 in response to requests received from the client devices 206 for network content.

The client device 206 is representative of a plurality of client devices that may be coupled to the network 209. The client device 206 may include, for example, a processor-based system such as a computer system. Such a computer system may be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, smart-televisions, smart picture frames, and similar devices), a videogame console, smart speakers (e.g., AMAZON ECHO®, GOOGLE HOME®, APPLE HOMEPOD®, or similar devices), or other devices with like capability. The client device 206 may include one or more displays 253, such as liquid crystal displays (LCDs), gas plasma-based flat panel displays, organic light emitting diode (OLED) displays, electrophoretic ink ("E-ink") displays, projectors, or other types of display devices. In some instances, the display 253 may be a component of the client device 206 or may be connected to the client device 206 through a wired or wireless connection.

The client device 206 may be configured to execute various applications such as a client application 256 or other applications. The client application 256 may be executed in a client device 206, for example, to access network content served up by the computing environment 203 or other servers, thereby rendering a user interface 100 (FIG. 1) on the display 253. To this end, the client application 256 may include, for example, a browser, a dedicated application, or other executable and the user interface 100 may include a network page, an application screen, or other user mechanism for obtaining user input. The client device 206 may be configured to execute applications beyond the client application 256 such as, for example, email applications, social networking applications, word processors, spreadsheets, or other applications.

Next, a general description of the operation of the various components of the networked environment 200 is provided. A more detailed description of the operation of specific components of the networked environment 200 is provided later in the present disclosure.

To begin, the page generator 216 identifies a search query 229 for which to generate a network page 233. For instance, the page generator 216 may generate the network page 233 in response a search query 229 provided by the client application 256 executing on the client device 206. For example, if a user of the client device 206 submits a search query 229 containing the search terms 246 "best bug spray for camping" to the electronic commerce application 219, the electronic commerce application 219 could forward the search query 229 to the page generator 216 to cause the page generator 216 to create a network page 233 responsive to the search query 229. In other instances, the page generator 216 may perform an analysis of previously submitted search queries 229 in the data store 223 to determine whether to generate a network page 233. For example, if users have submitted a number of search queries 229 containing the search terms 246 "best bug spray for camping," but no network page 233 responsive to the search queries 229 containing the search terms 246 "best bug spray for camping" exists, then the page generator 216 may determine that a network page 233 is to be generated.

The page generator 216 then parses the search query 229 to identify individual search terms 246. For example, the page generator 216 may identify a first search term 246 in the search query 229 that identifies the category or subcategory of item 236 that is being searched for and a second search term 246 specifying an intended use of the item 236. For instance, if the search query 229 is "bug spray for camping," the page generator 216 may determine that the first search term 246 is "bug spray" and the second search term 246 is "for camping" or "camping."

After identifying the search terms 246, the page generator 216 identifies a number of candidate or potential items 236 that may be responsive to the search query 229. For example, the page generator 216 may identify a category or subcategory of items 236 in the item catalog 226 that is the closest match for the first one of the search terms 246. Using the example of the search query 229 "bug spray for camping," the page generator 216 could identify a category of items in the item catalog labeled "insect repellant" as being the closest match to the search term 246 "bug spray."

The page generator 216 may then select items 236 in the item category based on various criteria. For example, the page generator 216 could select a predefined number of the bestselling items 236 in the item category of "insect repellant." An item 236 could be considered to be the "best seller" based on various criteria, such as the largest number of total sales through the electronic commerce application 219, the largest number of sales in a preceding period of time, or some other factor. As another example, the page generator 216 could select a predefined number of the most highly rated items 236. An item 236 could be considered to be most highly rated if its average score based on user reviews or similar user content 243 is higher than the average score of other items 236. As a third example, the page generator 216 could select the most highly rated item 236 or the bestselling item 236 and then select an additional number of similar items 236. An item 236 might be considered similar, for example, if it was purchased by a user after the user viewed the most highly rated item 236 or the bestselling item 236 using the electronic commerce application 219. Such a similar item need not be in the same category as the most highly rated item 236 or the bestselling item 236. As another example, an item 236 might be considered to be similar if the item 236 is included in the same search results 249 for one or more of the same search queries 229.

In some instances, the page generator 216 may filter its search for items 236 based on various criteria. For example, the page generator 216 may require that an item 236 have a predefined minimum number of instances of user content 243 (e.g., user reviews, user-submitted answers to user-submitted questions, etc.) associated with the item 236 in order for the item 236 to be selected. As another example, the page generator 216 may require that an item 236 be currently "in stock" or otherwise available for purchase through the electronic commerce application 219.

For each potential or candidate item 236, the page generator 216 evaluates the suitability of the item 236 for the purpose or use specified by the second search term 246 in the search query 229. For instance, the page generator 216 may parse each instance of user content 243 for the second search term 246 specifying the intended use of the item 236. As an example, if the search query 229 were "bug spray for camping," then the page generator 216 could parse each instance of user content 243 for the presence of the term "camping." If the second search term 246 is present in an instance of user content 243 (e.g., "camping" is present in a user review), the page generator 216 select a snippet or segment of the instance of the user content 243 that contains the second search term 246 (e.g., selecting a predefined number of characters or words appearing before and after the word "camping" in the user review).

The page generator 216 then sends the snippet or segment of the instance of the user content 243 to the sentiment engine 213 for evaluation. In response, the page generator 216 receives an indication of the sentiment. The indication of the sentiment could be represented using a variety of approaches. For example, sentiment could be expressed as a score within a potential range of scores. One end of the range of scores could represent positive sentiment, while the other end of the range of scores could represent negative sentiment. As another example, the indication of the sentiment could be represented as a binary (e.g., positive or negative) or ternary (e.g., positive, negative, or neutral) result. In some instances, the response that the page generator 216 receives from the sentiment engine 213 could also include a confidence score or interval indicating the margin of error or accuracy of the result provided by the sentiment engine 213.

A snippet or segment of the user content 243 may be used because it will often provide more accurate results compared to using the entire instance of user content 243. For example, a user review of insect repellant spray may be generally negative because the user review included complaints that the insect repellant was difficult to apply and had an unpleasant smell. However, in spite of the generally negative user sentiment, the user review might contain a very positive statement that the insect repellant spray is great for a specific purpose such as hiking or camping because it is long-lasting and is very effective due to a large percentage of the active ingredient being present in the formula. Therefore, if the search query 229 is "bug spray for camping," the page generator 216 may more accurately identify potential or candidate items 236 by relying on specific portions of user content 243 most relevant to the search terms 246 in the search query 229.

The page generator 216 may then rank the candidate items 236 based on the results provided by the sentiment engine 213. For example, the page generator 216 may rank candidate items 236 based on which candidate items 236 have the highest number of instances of user content 243 that contain positive sentiment. As another example, the page generator 216 may rank candidate items 236 based on which candidate item 236 has an instance of user content 243 containing the most positive sentiment. As a third example, the page generator 216 could score each item 236 based on the number of instances of user content 243 that contain positive sentiment and the degree of positive sentiment associated with each instance of user content 243. For instance, if sentiment is scored by the sentiment engine 213 on a scale of 0-100, with 100 representing the most positive sentiment possible, then the page generator 216 could sum the sentiment score for each instance of user content 243 to generate a total sentiment score for the item 236. Items 236 could then be ranked based at least in part on sentiment score. An approach like this would allow for lesser known, but very highly regarded, items 236 to be compared with items 236 that are more well-known, but may not be as well regarded.

After ranking the candidate items 236 based at least in part on the results provided by the sentiment engine 213, the page generator 216 selects a predefined number of the candidate items 236 that have the most positive sentiment. The page generator 216 then creates network pages 233 containing the selected items 236.

To create the network page 233, the page generator 216 may insert content related to the selected items 236 into a network page 233 template. For example, the page generator 216 may add images of the item 236 to the network page 233. The page generator 216 may also add a portion of the item description 239 to the network page 233, such as the name, make, and model of the item 236 or an introductory sentence or two extracted from description 239 of the item 236. The page generator 216 may also add one or two of the segments or snippets of user content 243 associated with the item 236 that were identified as having the most positive sentiment by the sentiment engine 213 to allow a searching user to learn why an item 236 was selected for inclusion in the network page 233. The network page 233 may then be cached in the data store 223 for responding to future search queries 229 or provided to the client device 206 in response to the initial search query 229 submitted to the electronic commerce application 219.

Figure 3:
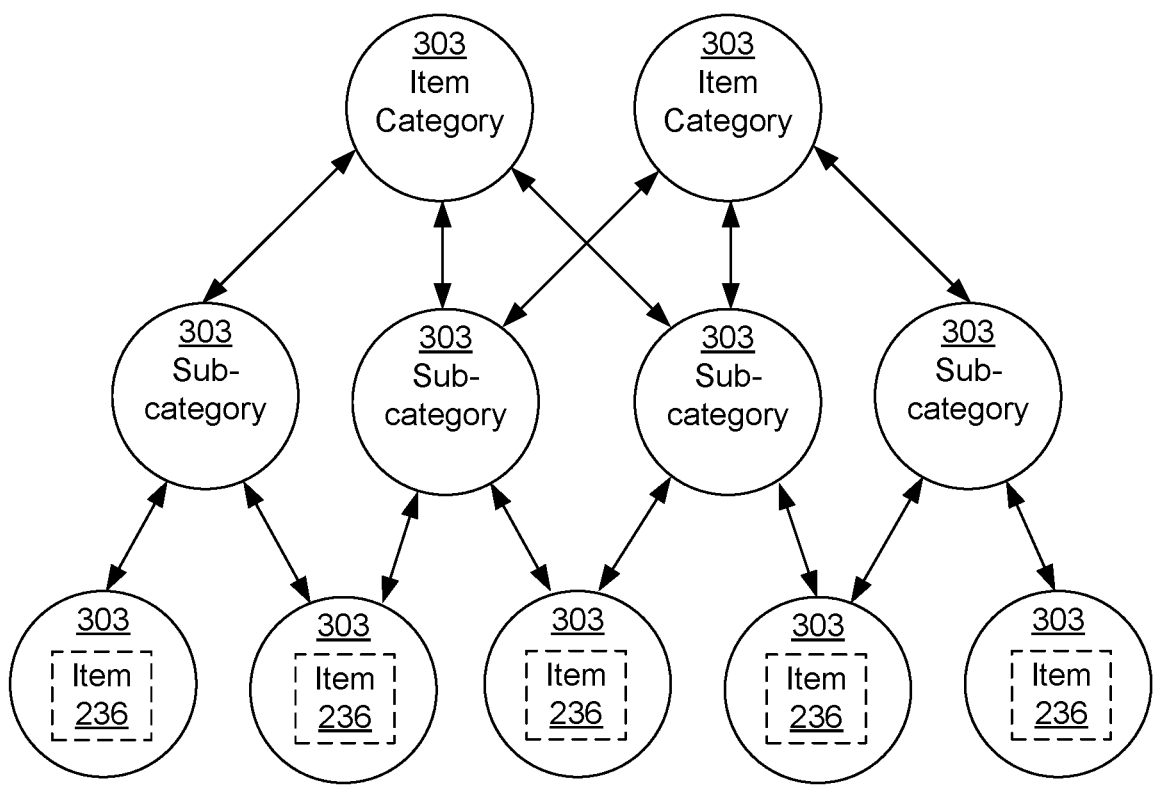
FIG. 3 is a schematic diagram illustrating one example of a data structure employed in various embodiments of the networked environment of FIG. 2.

FIG. 3 provides an illustration of an example implementation of the item catalog 226 data structure. As shown, an item catalog 226 may include one or more browse nodes 303 that form a graph or similar data structure. Some browse nodes 303 may be used to represent item 236 categories. A browse node 303 representing an item 236 category may have one or more browse nodes 303 representing a subcategory. In some embodiments, a browse node 303 representing a subcategory may have multiple browse nodes 303 representing more specific subcategories. However, a browse node 303 representing a subcategory may also include one or more browse nodes 303 representing an item 236 within the subcategory. As o an application traverses the browse nodes 303 within the item catalog 226, the application may search for items 236 based on the category or subcategory within the catalog that the browse node 303 for an item 236 is located.

As illustrated, a browse node 303 in the item catalog 226 may have multiple parent browse nodes 303 or multiple child browse nodes 303. For example, an item 236 may be classified in multiple subcategories or categories within the item catalog 226. For example, the item 236 of "Stay Away Bug Spray" may be in a browse node 303 with parent browse node 303 for the subcategory of "Insect Repellent." The subcategory browse node 303 could have two parent item category browse nodes 303, such as "Outdoor Recreation" and "Health and Wellness."

Figure 4:
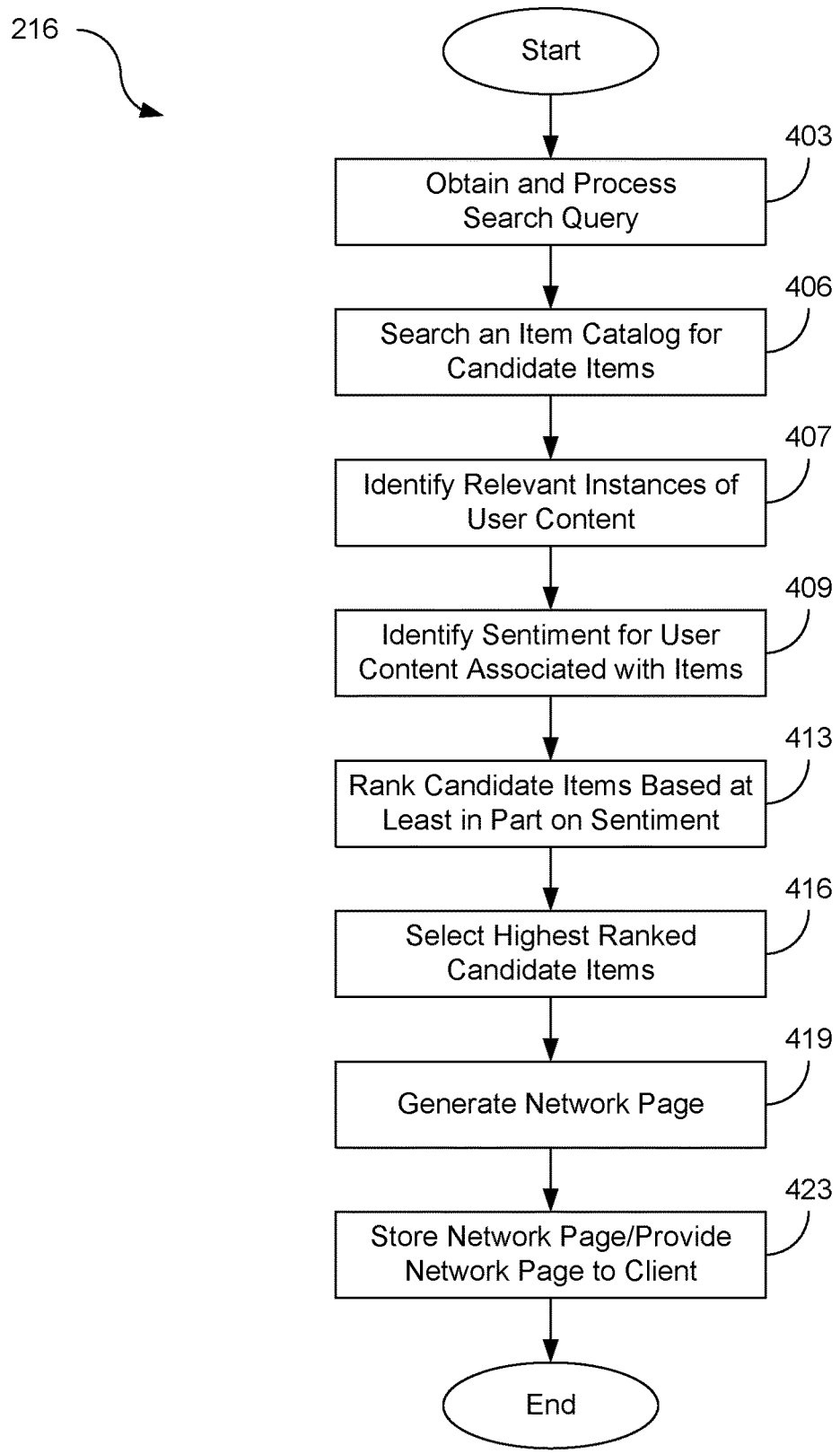
FIG. 4 is a flowchart illustrating one example of functionality implemented as portions of an application executed in a computing environment in the networked environment of FIG. 2 according to various embodiments of the present disclosure.

FIG. 4 depicts a flowchart that provides one example of the operation of a portion of the page generator 216 according to various embodiments. It is understood that the flowchart of FIG. 4 provides merely an example of the many different types of functional arrangements that may be employed to implement the operation of the portion of the page generator 216 as described herein. As an alternative, the flowchart of FIG. 4 may be viewed as depicting an example of elements of a method implemented in the computing environment 203 (FIG. 2) according to one or more embodiments.

Beginning with box 403, the page generator 216 obtains one or more search queries 229 (FIG. 2) to use as a basis for generating a network page 233 (FIG. 2). For example, the page generator 216 may receive a search query 229 forwarded from an electronic commerce application 219 (FIG. 2), which received the search query 229 in turn from a client device 206 (FIG. 2). As another example, the page generator 216 may analyze one or more search queries 229 stored in the data store 223 (FIG. 2) in order to generate a network page 233 for responding to future instances of the search query 229 or similar search queries 229.

At box 403, the page generator 216 may also process the search query 229 to identify one or more search terms 246 (FIG. 2) present in the search query 229. For example, the page generator 216 may identify a first search term 246 that identifies an item 236 or category of items 236 in the item catalog 226. The page generator 216 may also identify a second search term 246 that specifies a desired function or intended use of the item 236. For example, given the search query 229 "bug spray for camping," the page generator 216 may determine that a first search term 246 is "bug spray" and that the second search term 246 is "camping."

Next at box 406, the page generator 216 searches an item catalog 226 (FIG. 2) to identify one or more items 236 that are potential or candidate items 236 to use in generating a network page 233 responsive to the search query 229. Several approaches may be used, as further described below. Although each approach is described separately, a combination of any number of the approaches may be used to further filter or refine the list of potential or candidate items 236.

The page generator 216 may search an item catalog 226 to identify a browse node 303 (FIG. 3) representing a category or sub-category that most closely matches the first search term 246. For instance, the page generator 216 may search for a browse node 303 that contains a category or sub-category name that matches the first search term 246. If no browse node 303 contains a category or sub-category name matching the first search term 246, then the page generator 216 may select a browse node 303 that most closely matches the first search term 246 from the browse nodes 303 within the item catalog 226.

Then, in some implementations, the page generator 216 selects a predefined number of items 236 classified within the category or subcategory corresponding to the selected browse node 303. The page generator 216 may select the items 236 based on one or more criteria. For example, the page generator 216 may select the bestselling items 236 based on total sales or on sales volume (e.g., total sales within a predefined time period such as the last week, last month, last year, etc.). As another example, the page generator 216 may select one more items 236 based on an average user rating (e.g., selecting only those items that have an average rating greater than a four out of five). In some of these examples, the page generator 216 may limit the selection of items 236 based at least in part on average user rating to those items 236 with a minimum number of user ratings.

However, in other implementations, the page generator 216 may select a preferred item 236 classified within the category or subcategory represented by the selected browse node 303 and then select a number of similar items 236. The preferred item 236 may identified through a number of approaches. For instance, the page generator 216 may identify an item 236 that has the highest average user rating for a minimum number of user reviews as being the preferred item 236. As another example, the page generator 216 may identify the bestselling item 236, the item 236 with the fewest returns, or the item 236 with the most instances of user content 243 (FIG. 2) associated with the item 236. In some implementations, several of these factors may be used together to identify the preferred item 236. For instance, if several items 236 are tied for the highest average user rating, then the bestselling one of those items 236 may be selected as the preferred item 236.

After selecting the preferred item 236, similar items 236 are identified within the item catalog 226. An item 236 may be identified as similar through a number of approaches. For example, items 236 that were purchased after a user viewed the preferred item 236 may be considered to be similar. As another example, items 236 that were viewed or added to an electronic shopping cart, but not purchased, may be considered to be similar. As a third example, items 236 that appear in the same sets of search results 249 that contain the preferred item 236 may be considered to be similar. The more sets of search results 249 that contain both the preferred item 236 and a second item 236, the more likely the second item 236 might be considered to be similar to the preferred item 236.

These similar items 236 need not be classified under the same category or sub-category as the preferred item 236. However, a similar item 236 that is in a related category or subcategory may be given more weight than a similar item 236 that is classified in an unrelated category or subcategory. For example, if two items 236 are classified in different subcategories, but are classified within the same category of the item catalog 226, they might be weighted as being more similar than two items 236 classified in both different subcategories and categories.

In implementations that search for similar items 236, the page generator 216 may end up identifying unconventional recommendations. For example, searches for "tents for camping" may result in the page generator 216 identifying both tents and items 236 that may be used for the same purpose (e.g., tarps). These unconventional recommendations may be desired in order to surface to a user items 236 they may not be aware of for a particular purpose.

At box 407, the page generator 216 identifies instances of user content 243 associated with each item 236 that are relevant to the search query 229. For example, the page generator 216 may provide the list of potential or candidate items 236 to the relevance engine 215 (FIG. 2) along with one or more search terms 246, such as the second search term 246 indicating the characteristic, purpose, or intended use of the potential or candidate items 236. The page generator 216 then receives identifiers for each instance of user content 243 associated with each item 236 that is relevant to the search query 229.

Moving on to box 409, the page generator 216 determines the user sentiment towards the candidate items 236. Accordingly, the page generator 216 identifies selects up to a predefined maximum number of instances of user content 243 associated with each one of the candidate items 236 and determines an intent associated with each selected instance of user content 243. If an item 236 has less than the predefined maximum number of instances of user content 243 that contain the second search term (e.g., where a maximum of ten reviews containing the word "camping" are to be selected, but a tent with twenty-five reviews only has six reviews that contain the word "camping"), then all instances of user content 243 that contain the second search term will be selected by the page generator 216. A segment, snippet, or portion of each selected instance of user content 243 is then sent to the sentiment engine 213. The segment, snippet, or portion may include a predefined number of characters or words that precede or follow the second search term 246 in the instance of user content 243. A segment, snippet, or portion of the instance of user content 243 may be used to identify the sentiment towards the item 236 with respect to the desired use, rather than to identify the sentiment towards the item 236 generally. For example, a user may submit a poor review of an item 236 because it was inadequate for one purpose due to a lack of certain features, but note in a portion of the review of the item 236 that the item 236 would be excellent for another purpose. For instance, a user review of a tent might rate a tent as average because it was inadequate for use at large events (e.g., a first-aid tent or event staff tent at a festival), but note that the tent was or would make an excellent tent for camping.

In response to each snippet or segment of user content 243 submitted to the sentiment engine 213, the page generator 216 may receive an indication of the sentiment for the snippet or segment of user content 243. The indication of the sentiment could be represented using a variety of approaches. For example, sentiment could be expressed as a score within a potential range of scores. One end of the range of scores could represent positive sentiment, while the other end of the range of scores could represent negative sentiment. As another example, the indication of the sentiment could be represented as a binary (e.g., positive or negative) or tertiary (e.g., positive, negative, or neutral) result. In some instances, the response that the page generator 216 receives from the sentiment engine 213 could also include a confidence score or interval indicating the margin of error or accuracy of the result provided by the sentiment engine 213.

Proceeding next to box 413, the page generator 216 ranks the candidate or potential items 236 based at least in part on the user sentiment identified for each instance of user content 243 associated with each of the candidate or potential items 236. A number of approaches may be used to rank the candidate or potential items 236. For example, the page generator 216 may rank candidate items 236 based on which candidate items 236 have the highest number of instance of user content 243 that contain positive sentiment. As another example, the page generator 216 may rank candidate items 236 based on which candidate item 236 has an instance of user content 243 containing the most positive sentiment. As a third example, the page generator 216 could score each item 236 based on the number of instances of user content 243 that contain positive sentiment and the degree of positive sentiment associated with each instance of user content 243. For instance, if sentiment is scored by the sentiment engine 213 on a scale of 0-100, with 100 representing the most positive sentiment possible, then the page generator 216 could sum the sentiment score for each instance of user content 243 to generate a total sentiment score for the item 236. Items could then be ranked based at least in part on sentiment score. An approach like this would allow for lesser known, but very highly regarded, items 236 to be compared with items 236 that are more well-known, but may not be as well regarded.

Referring next to box 416, the page generator 216 selects a predefined minimum number of the highest ranked candidate or potential items 236 for inclusion in a network page 233. However, if there are not enough items 236 to meet the predefined minimum number, the page generator 216 may perform one of several actions. First, the page generator 216 may repeat the process described for boxes 406-413 using an alternative approach to identifying and selecting candidate items 236. In the alternative, the page generator 216 may simply end the process at this point. However, if a sufficient number of potential or candidate items 236 exist from which the page generator 216 may select the selects a predefined minimum number, then execution proceeds to box 419.

At box 419, the page generator 216 generates a network page 233. The network page 233 may include the search query 229 (e.g., "tents for camping" or "sunscreen for the beach"), links to the detail pages for the selected items 236, as well as one or more instances of user content 243 associated with each of the selected items 236. For example, for each item 236 included in the network page 233, the page generator 216 may select an instance of user content 243 that has the highest score of positive sentiment or the best confidence rating or interval associated with the positive sentiment. This could, for instance, be a portion, segment, or snippet of a user review that was determined by the sentiment engine 213 to have the most positive sentiment or be the most likely to have a positive sentiment.

In some embodiments, the network page 233 may be created using a template. The template may allow for portions of the description 239 of a selected item 236 to be placed in particular locations to allow for a uniform look and feel. Likewise, the template may reserve specific portions of the network page 233 for the instances of user content 243 associated with each of the selected items 236 that have the most positive sentiment.

Then at box 423, the page generator 216 saves the network page 233 to the data store 223 in order for the network page 233 to be served in response to future search queries 229 submitted by the client device to the electronic commerce application 219. In some embodiments, the page generator 216 may also return the network page 233 directly to a client device 206 in response to a search query 229 submitted to the client device 206, or provide the network page 233 to the electronic commerce application 219 to provide to the client device 206.

Figure 5:
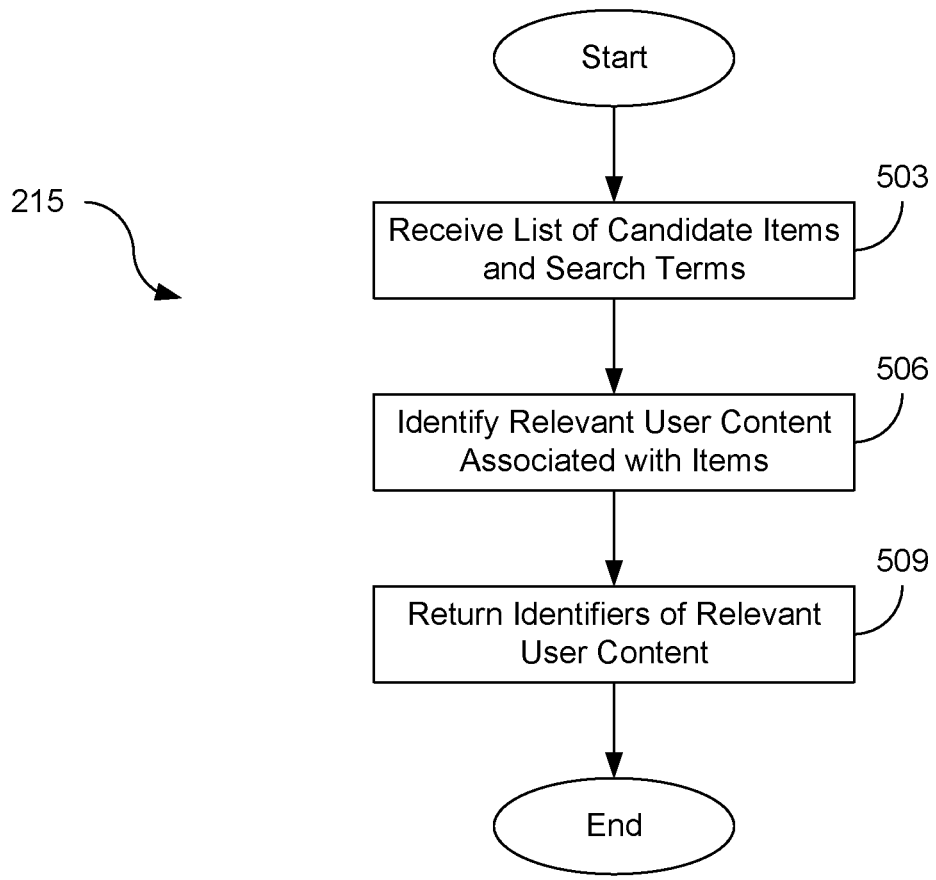
FIG. 5 is a flowchart illustrating one example of functionality implemented as portions of an application executed in a computing environment in the networked environment of FIG. 2 according to various embodiments of the present disclosure.

FIG. 5 depicts a flowchart that provides one example of the operation of a portion of the relevance engine 215 according to various embodiments. It is understood that the flowchart of FIG. 5 provides merely an example of the many different types of functional arrangements that may be employed to implement the operation of the portion of the relevance engine 215 as described herein. As an alternative, the flowchart of FIG. 5 may be viewed as depicting an example of elements of a method implemented in the computing environment 203 (FIG. 2) according to one or more embodiments.

To begin, the relevance engine 215 receives the list of candidate or potential items 236 and one or more search terms 246 at box 503. For example, the relevance engine 246 may receive the second search term 246 identifying the intended use, purpose, or characteristic of the item 236. This information may be received, for example, from the page generator 216 as it attempts to identify the most relevant items 236 for use in a generating a network page 233. Other information may also be provided according to various embodiments of the present disclosure.

Then, at box 506, the relevance engine 215 identifies relevant instances of user content 243 for each of the candidate or potential items 236. The identifier for each instance of user content 243 found to be relevant may be recorded. Relevant instances of user content 243 may be selected through various approaches.

For example, the page generator 216 may select those instances of user content 243 that contain the second search term 246. For instance, if the search query 229 were "shoes for cycling," the relevance engine 215 may select user reviews or user answers to user-submitted questions that contain the word "cycling" as "cycling" is the second search term 246. In some embodiments, synonyms of the second search term 246 may also be searched. For example, the relevance engine 215 could also select user reviews or user answers to user-submitted questions that contained "biking" or "bicycling" as these words are synonymous with "cycling." However, other approaches to determine relevance of a particular instance of user content 243 may also be used according to various embodiments of the present disclosure.

Subsequently, at box 509, the relevance engine 215 returns the identified instances of user content 243 that have been identified as being relevant. For example, for each item 236, the relevance engine 215 could return a list containing identifiers for each instance of user content 243 found to be relevant to the particular search terms 246 provided.

Figure 6:
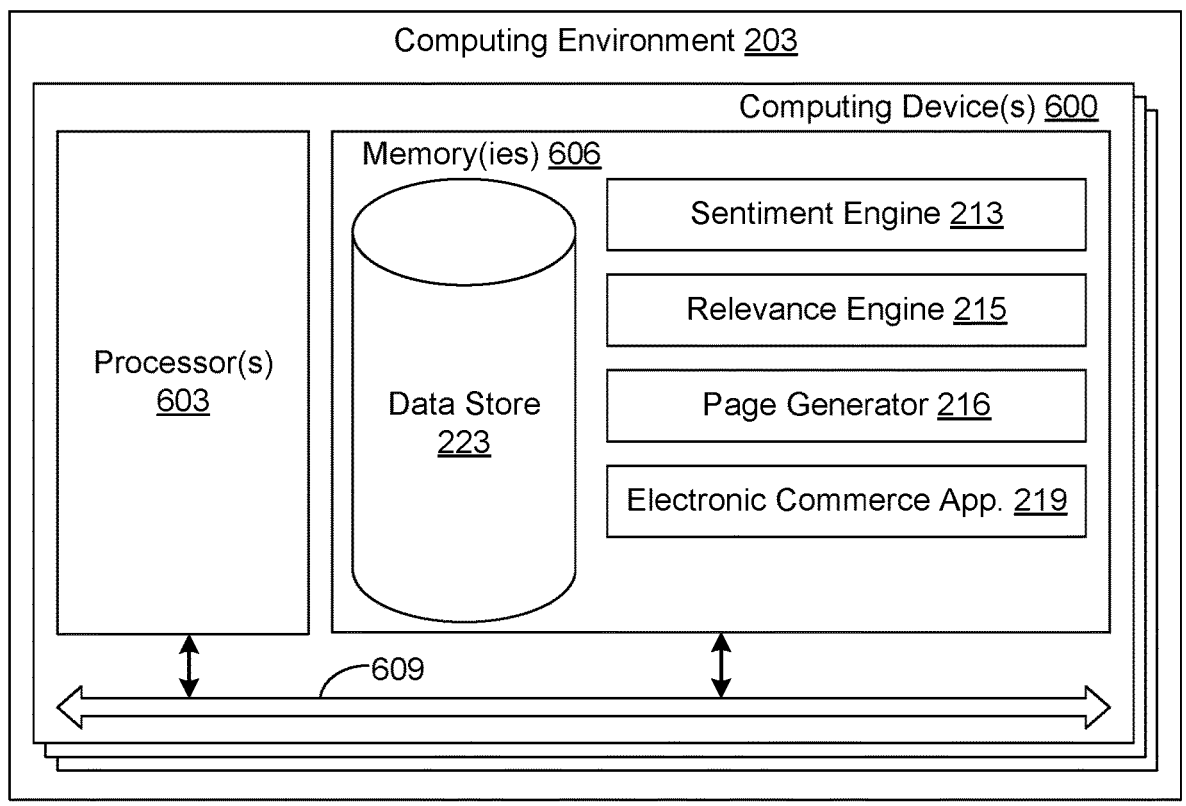
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may include, for example, at least one server computer or like device. The local interface 609 may include, for example, a data bus with an accompanying address/control bus or other bus structure as may be appreciated.

Stored in the memory 606 are both data and several components that are executable by the processor 603. In particular, stored in the memory 606 and executable by the processor 603 are the sentiment engine 213, the page generator 216, and the electronic commerce application 219, and potentially other applications. Also stored in the memory 606 may be a data store 223 and other data. In addition, an operating system may be stored in the memory 606 and executable by the processor 603.

It is understood that there may be other applications that are stored in the memory 606 and are executable by the processor 603 as may be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that may ultimately be run by the processor 603. Examples of executable programs may be, for example, a compiled program that may be translated into machine code in a format that may be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 603 may represent multiple processors 603 or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606. The local interface 609 may include additional systems designed to coordinate this communication, including, for example, performing load balancing. The processor 603 may be of electrical or of some other available construction.

Although the sentiment engine 213, the relevance engine 213, the page generator 216, and the electronic commerce application 219, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the page generator 216, while the flowchart of FIG. 5 shows the functionality of portions of the relevance engine 213. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 603 in a computer system or other system. The machine code may be converted from the source code through various processes. For example, the machine code may be generated from the source code with a compiler prior to execution of the corresponding application. As another example, the machine code may be generated from the source code concurrently with execution with an interpreter. Other approaches may also be used. If embodied in hardware, each block may represent a circuit or a number of interconnected circuits to implement the specified logical function or functions.

Although the flowcharts of FIG. 4 and FIG. 5 show a specific order of execution, it is understood that the order of execution may differ from that which is depicted. For example, the order of execution of two or more blocks may be scrambled relative to the order shown. Also, two or more blocks shown in succession in FIG. 4 or FIG. 5 may be executed concurrently or with partial concurrence. Further, in some embodiments, one or more of the blocks shown in FIG. 4 or FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the sentiment engine 213, the relevance engine 213, the page generator 216, and the electronic commerce application 219, that includes software or code may be embodied in any non-transitory computer-readable medium for use by or in connection with an instruction execution system such as, for example, a processor 603 in a computer system or other system. In this sense, the logic may include, for example, statements including instructions and declarations that may be fetched from the computer-readable medium and executed by the instruction execution system. In the context of the present disclosure, a "computer-readable medium" may be any medium that may contain, store, or maintain the logic or application described herein for use by or in connection with the instruction execution system.

The computer-readable medium may include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the sentiment engine 213, the relevance engine 213, the page generator 216, and the electronic commerce application 219, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine readable instructions stored in the memory that, when executed by the processor, cause the computing device to at least:
select a query stored in the memory, the query containing a first search term and a second search term;
determine that the first search term identifies an item and that the second search term identifies an intended use of the item;
search an item catalog for a browse node that includes the item and is related to the intended use of the item;
identify relevance of a number of items classified within the browse node to generate a list of relevant items that are relevant to the query, each of the number of items further matching a criterion in addition to the query;
identify a sentiment for a respective one of a plurality of user-submitted reviews associated with individual items in the list of relevant items, the sentiment comprising a binary or ternary sentiment value that is identified based at least in part on a natural language analysis of a snippet of a respective user-submitted review, wherein the snippet is limited to a predetermined number of characters proximate to the second search term that identifies the intended use;
assign a rank for each item in the list of relevant items based at least in part on the sentiment value;
select a subset of the list of relevant items, wherein the subset of the list of relevant items is associated with a highest user sentiment among the list of relevant items based at least in part on the rank for each item;
identify a network page template that structures portions of a description of a respective one of the subset of the list of relevant items according to corresponding locations, wherein the network page template specifies a particular location for a portion of a description corresponding to the snippet; and
insert content for the portions of the description of the respective one of the subset of the list of relevant items into the network page template to generate a network page that includes the subset of the list of relevant items associated with the highest user sentiment, wherein the snippet is inserted into the particular location specified by the network page template.

2. The system of claim 1, wherein the machine readable instructions that cause the computing device to generate the network page further cause the computing device to at least:
identify a user review associated with each of the subset of the list of relevant items;
select a portion of the user review; and
insert an image of each of the subset of the list of relevant items into the network page in a spatial relationship with a quote from a respective user review.

3. The system of claim 1, wherein the criterion comprises a sales volume.

4. The system of claim 1, wherein the criterion comprises a minimum average rating.

5. The system of claim 1, wherein the machine-readable instructions, when executed by the processor, further cause the computing device to at least:
receive the query from a client device; and
store the query in the memory of the computing device.

6. A system, comprising:
a computing device comprising a processor and a memory; and
machine readable instructions stored in the memory that, when executed by the processor, cause the computing device to at least:
obtain a query containing a first search term and a second search term;
determine that the first search term identifies an item and the second search term specifies an intended use of the item;
search an item catalog for a browse node representing an item category or subcategory that includes the item;
select a plurality of relevant items linked to the browse node, wherein a respective one of the plurality of relevant items includes user-submitted content that contain the second search term and are associated with at least one of the plurality of relevant items;
parse the user-submitted content to generate a snippet of the user-submitted content comprising the second search term and a predetermined number of words proximate to the second search term;
identify a sentiment value for the user-submitted content associated with the respective one of the plurality of relevant items, wherein the sentiment value is identified from a predetermined range of sentiment values based at least in part on an evaluation of the snippet of the user-submitted content, wherein a respective sentiment value of the predetermined range of sentiment values provides an indication of suitability of the item for the intended use;
select a subset of the at least some of the plurality of relevant items based at least in part on the sentiment value for the user-submitted content associated with the respective one of the plurality of relevant items; and
insert content into a network page template to generate a network page, the network page comprising the subset of the plurality of relevant items and at least one instance of user content associated with the subset of the plurality of relevant items, wherein the snippet of the user-submitted content is inserted into a particular location of the network page template that is reserved for the user-submitted content.

7. The system of claim 6, wherein the plurality of relevant items are selected based at least in part on relevance to the query, and a criterion comprising a minimum average user rating.

8. The system of claim 6, wherein the plurality of relevant items are selected based at least in part on relevance to the query, and a criterion comprising a sales volume.

9. The system of claim 6, wherein the machine readable instructions further cause the computing device to at least determine that the plurality of relevant items exceeds a minimum number of items.

10. The system of claim 6, wherein the machine readable instructions that cause the computing device to select the plurality of relevant items linked to the browse node further cause the computing device to at least:
identify an item linked to the browse node with a highest average user rating among a plurality of average user ratings for a plurality of items linked to the browse node, wherein the network page further comprises the item.

11. The system of claim 6, wherein the query is a first query and the machine readable instructions further cause the computing device to at least provide the network page to a client device in response to receipt of a second query from the client device, the second query containing the first search term and the second search term.

12. The system of claim 6, wherein the machine-readable instructions that cause the computing device to at least obtain the query containing the first search term and the second search term further cause the computing device to at least:
receive the query from a client device; and
store the query in the memory of the computing device.

13. A computer-implemented method, comprising:
selecting, via a computing device, a query archived in a data store, the query containing a first search term for an item and a second search term for an intended use of the item;
searching, via the computing device, an item catalog for a first plurality of items related to the first search term and the second search term;
identifying, via the computing device, a first item within the first plurality of items;
identifying, via the computing device, a set of items purchased by users who have also viewed the first item;
selecting, via the computing device, a plurality of instances of user-submitted content for each of the set of items purchased by the users who have also viewed the first item, each of the plurality of instances of user-submitted content comprising the second search term;
identifying, via the computing device, a sentiment for a respective one of the plurality of instances of user-submitted content for each of the set of items purchased by the users who have also viewed the first item, the sentiment comprising a sentiment value that is identified from a predetermined range of sentiment values based at least in part on an evaluation of a snippet of a corresponding one of the plurality of instances of user-submitted content, the snippet comprising the second search term and a predetermined number of words or characters proximate to the second search term;
assigning a ranking, via the computing device, of the set of items based at least in part on the sentiment value identified for each of the plurality of instances of user-submitted content for each of the set of items;
selecting a subset of the set of items;
generating, via the computing device, a list of selected items that includes at least the first item and the subset of the set of items; and
creating, via the computing device, a network page that includes the list of selected items and at least one instance of user content associated with each item in the list of selected items, the network page being created based at least in part on a network page template that specifies a particular location for user-submitted content, wherein the sentiment value is inserted into the particular location.

14. The computer-implemented method of claim 13, wherein at least one of the plurality of instances of user-submitted content for each of the set of items is a user-submitted answer to a user-submitted question.

15. The computer-implemented method of claim 13, wherein at least one of the plurality of instances of user-submitted content is a user-submitted review.

16. The computer-implemented method of claim 13, wherein the query is a first query, and the computer-implemented method further comprises:
   receiving, via the computing device, a second query from a client device, the second query containing the first search term and the second search term; and
   providing, via the computing device, the network page to the client device in response to the second query.

17. The computer-implemented method of claim 13, further comprising selecting the at least one instance of user content associated with each item in the list of selected items based at least in part on a sentiment of the at least one instance of user content.

18. The computer-implemented method of claim 13, further comprising:
   receiving, via the computing device, the query from a client device; and
   archiving, via the computing device, the query in the data store.

19. The computer-implemented method of claim 13, further comprising:
   identifying a number of the plurality of instances of user-submitted content that are associated with a positive sentiment according to the sentiment value for the respective one of the plurality of instances of user-submitted content, wherein the ranking of the set of items is assigned based at least in part on the number.

* * * * *